(12) United States Patent
Dawson et al.

(10) Patent No.: US 8,648,865 B2
(45) Date of Patent: **\*Feb. 11, 2014**

(54) VARIABLE RENDERING OF VIRTUAL UNIVERSE AVATARS

(75) Inventors: Christopher J. Dawson, Arlington, VA (US); Barry M. Graham, Silver Spring, MD (US); Rick A. Hamilton, II, Charlottesville, VA (US); James R. Kozloski, New Fairfield, CT (US); Clifford A. Pickover, Yorktown Heights, NY (US)

(73) Assignee: International Business Machines Corporation, Armonk, NY (US)

(\*) Notice: Subject to any disclaimer, the term of this patent is extended or adjusted under 35 U.S.C. 154(b) by 1162 days.

This patent is subject to a terminal disclaimer.

(21) Appl. No.: 12/238,560

(22) Filed: Sep. 26, 2008

(65) Prior Publication Data

US 2010/0083140 A1    Apr. 1, 2010

(51) Int. Cl.
*G06T 13/00* (2011.01)

(52) U.S. Cl.
USPC .............................. 345/473; 715/757; 463/30

(58) Field of Classification Search
USPC .............................. 345/473; 715/757; 463/30
See application file for complete search history.

(56) References Cited

U.S. PATENT DOCUMENTS

| 7,025,675 | B2 | 4/2006 | Fogel et al. |
| 7,073,129 | B1 | 7/2006 | Robarts et al. |
| 7,237,201 | B2 | 6/2007 | Fish |
| 2007/0021200 | A1 | 1/2007 | Fox et al. |
| 2007/0106526 | A1 | 5/2007 | Jung et al. |
| 2007/0274519 | A1 | 11/2007 | Cohen et al. |
| 2008/0189625 | A1* | 8/2008 | Zuta et al. ........... 715/753 |

FOREIGN PATENT DOCUMENTS

WO    2007120981    10/2007

OTHER PUBLICATIONS

WoWWiki, the Warcraft Wiki; "Invisibility"; May 22, 2007; pp. 1-2.*
WoWWiki, the Warcraft Wiki; "Raid target icons"; Mar. 25, 2008; pp. 1-2.*
Blizzard Entertainment; "World of Warcraft" manual; 2004; pp. 6 and 12.*
Brad Nicholson; "Gears of War 2 will feature violence filters"; Aug. 5, 2008; Destructoid; pp. 1-5; http://www.destructoid.com/gears-of-war-2-will-feature-violence-filters-98219.phtml.*

\* cited by examiner

*Primary Examiner* — Said Broome
*Assistant Examiner* — Peter Hoang
(74) *Attorney, Agent, or Firm* — Patrick J. Daugherty; Driggs, Hogg, Daugherty & Del Zoppo Co., LPA

(57) ABSTRACT

Avatar appearance attributes for use in rendering a first avatar within a virtual universe are associated with keys, wherein the first avatar is rendered to a second user in a virtual universe graphic user interface display with the defined appearance attribute as a function of a second avatar of the second user possessing the key. The first avatar may be rendered simultaneously to other users with an appearance attribute distinct from the defined appearance attribute rendered to the second user as a function of the other user's avatars not possessing the key. A key may be recognized as a function of an identity characteristic, and appearance attributes selected manually or as a function of a preference. Pluralities of avatar appearance attributes may be broadcast by an avatar for selection by key possession, and keys may be assigned as a function of a unique identity, a trait and an inventory asset.

19 Claims, 2 Drawing Sheets

VARIABLE RENDERING OF VIRTUAL UNIVERSE AVATARS

FIELD OF THE INVENTION

The present invention generally relates to providing customized Virtual Universe avatar attribute rendering, and more particularly to methods, systems, and program products for rendering the appearance of an avatar as a function of viewer or viewed-party parameters.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any graphic image may be utilized. In order to participate within or inhabit a VU, a user creates an agent which functions as the user's account, and upon which the user builds an avatar tied to an inventory of assets the user owns in the VU and associated with the agent.

VU assets, avatars, the VU environment, and anything presented to a user as visual information comprise Universally Unique Identifiers (UUID's) tied to geometric data distributed to users as textual coordinates, textures distributed to users as graphics files (in some examples as a JPEG2000 file), and effects data rendered by the user's client computer according to the user's preferences and user's computer system device capabilities. Many VU's are represented using three dimensional (3-D) graphics and landscapes and are populated by many thousands of users or "residents," often resembling the real world or fantasy/fictional worlds in terms of physics, houses, landscapes and in interpersonal communications with other users. Examples of large robust VU's and massively multiplayer online games include SECOND LIFE® (SL) (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both). Such examples render and display detailed, large and complex graphic environments within which users may travel and participate as if a character in an expressionistic or fantastical fictional world or within a somewhat realistic or representational approximation of real life (e.g. Second Life®).

VU's are also commonly defined with respect to VU regions, virtual areas of land within the VU typically residing on a single server, with each region amenable to provision and management by a one or more participating providers. The size and complexity and variety of resources found in a VU are related to the number of providers participating and hosting regions through server hosting. And the success of a VU may depend upon attracting users and keeping them engaged and participating in the VU environment, thereby adding value to the providers who bear the cost in providing VU region content and services (and correspondingly expect an appropriate level of multiple-user engagement as a return on their investment), as well as for other users who wish to engage many others in a large virtual community. For example, an informational or service-related region managed by a governmental or non-profit organization may desire or expect a given level of VU user engagement and participation, and commercial region providers may desire to engage in a given level of commercial transactions (e.g. sales) or achieve a level of marketing exposure among VU users.

VU's generally offer users a wide variety of options for configuring the appearance of their avatars. Avatars need bear little resemblance to the actual real-life user represented thereby, and in fact users commonly let their imaginations run wild in selecting and configuring representative avatars. The participant can choose and customize both the basic appearance and also the attire of the avatar, including both positive and offensive appearances. The participant also controls the actions, behavior, and interactions of his/her avatar with other participants, including both positive and offensive behaviors. In one aspect a user's avatar represents an extension of the user into a unique VU world, and the experience for the user may be enhanced in proportion to the degree with which the engagement of his avatar with other avatars in the VU utilizes interpersonal communication skills honed and developed in real-world, interpersonal person engagements.

Users often adopt avatar persona that bear little resemblance to their real-life physical features, including adopting avatars of the opposite sex. Users who maintain an outwardly conservative real-life persona may adopt an aggressive or extreme avatar appearance, for example a parent of four small children or the local Parent-Teacher Association president may select a "punk" avatar with provocative clothing and impossible or fanciful pierced jewelry and hair arrangements. Moreover, some users may select non-human avatars, such as cartoon, animal characters, robots or otherwise inanimate objects configured to animate as living entities. Although freedom in selecting and configuring avatar appearances beyond the normal constraints of real-life appearance options may be enjoyable and liberating to a user, protecting fanciful or extreme avatar attributes may create problems. More specifically, a user who has adopted an extreme avatar persona (for example, a suggestive or provocatively attired human avatar or a character associated with violent or illegal activities) may offend other virtual universe users who find such appearance attributes offensive or inappropriate in the (virtual universe) public domain. Negative behavioral aspects of a fanciful or extreme avatar character may also be imputed to the represented user: for example, other virtual universe users may get the impression that the user represented by the avatar engages in improper activities such as illegal drug use, and if the identity of a real-life user represented by an extreme avatar becomes known by the user's employer, parent, neighbor, teacher, local school principal, etc., the real-life user may suffer embarrassment or other negative repercussions, such as negative job performance ratings or even job loss.

Users who find the appearance of another user's avatar offensive or objectionable generally have little or no recourse to cure the offensive/objectionable attribute appearance. For example, a religiously or socially conservative user who objects strongly to immodest dress in public domains may be offended by avatars appearing in revealing or sexually provocative clothing configurations, and may stop participating in VU's where such behavior occurs. Public and private corporate entities organizations and associations also generally desire to protect their reputation, and reduce exposure to vicarious liability through the actions of their employees, members, etc., and thus also generally desire to avoid associations of their representatives with disreputable avatar characters in the public domains defined within the VU environment.

In another aspect, it may be difficult for users to remember the appearance of other user avatars, and thus to recognize the avatars of other users known to the user, which may result in embarrassing lapses in appropriate greetings. And even where the appearance of an avatar may be remembered, as users may frequently change avatar appearances a user may fail to recognize an avatar with a revised appearance, perhaps inadvertently insulting the otherwise-known user who wrongly thinks that he should have been recognized and is being snubbed.

SUMMARY OF THE INVENTION

Methods, devices, program products and systems are provided for viewer-responsive transformation of avatars in a virtual universe. Accordingly, methods define an avatar appearance attribute for use in rendering a first avatar within a virtual universe and associate defined appearance attributes with keys, wherein a second avatar encountering the first avatar within the virtual universe, the second avatar possessing the key, results in rendering the first avatar to a user of the second user in a virtual universe graphic user interface display with the defined appearance attribute as a function of the second avatar possessing the key.

In another aspect, methods are provided for deploying an application providing a computer infrastructure being operable to perform one or more of the method and/or process elements for viewer-responsive transformation of avatars in a virtual universe described above, for example by a service provider who offers to implement, deploy, and/or perform functions for others. Still further, an article of manufacture comprising a computer usable medium having the computer readable program embodied in said medium may be provided. Such program codes comprise instructions which, when executed on a computer system, cause a computer system to perform one or more of the method and/or process elements for viewer-responsive transformation of avatars in a virtual universe described above. Moreover, systems, articles and programmable devices configured for performing one or more of the method and/or process elements of the present invention for viewer-responsive transformation of avatars in a virtual universe, for example as described above, are also provided.

BRIEF DESCRIPTION OF THE DRAWINGS

These and other features of this invention will be more readily understood from the following detailed description of the various aspects of the invention taken in conjunction with the accompanying drawings in which.

Figure 1:
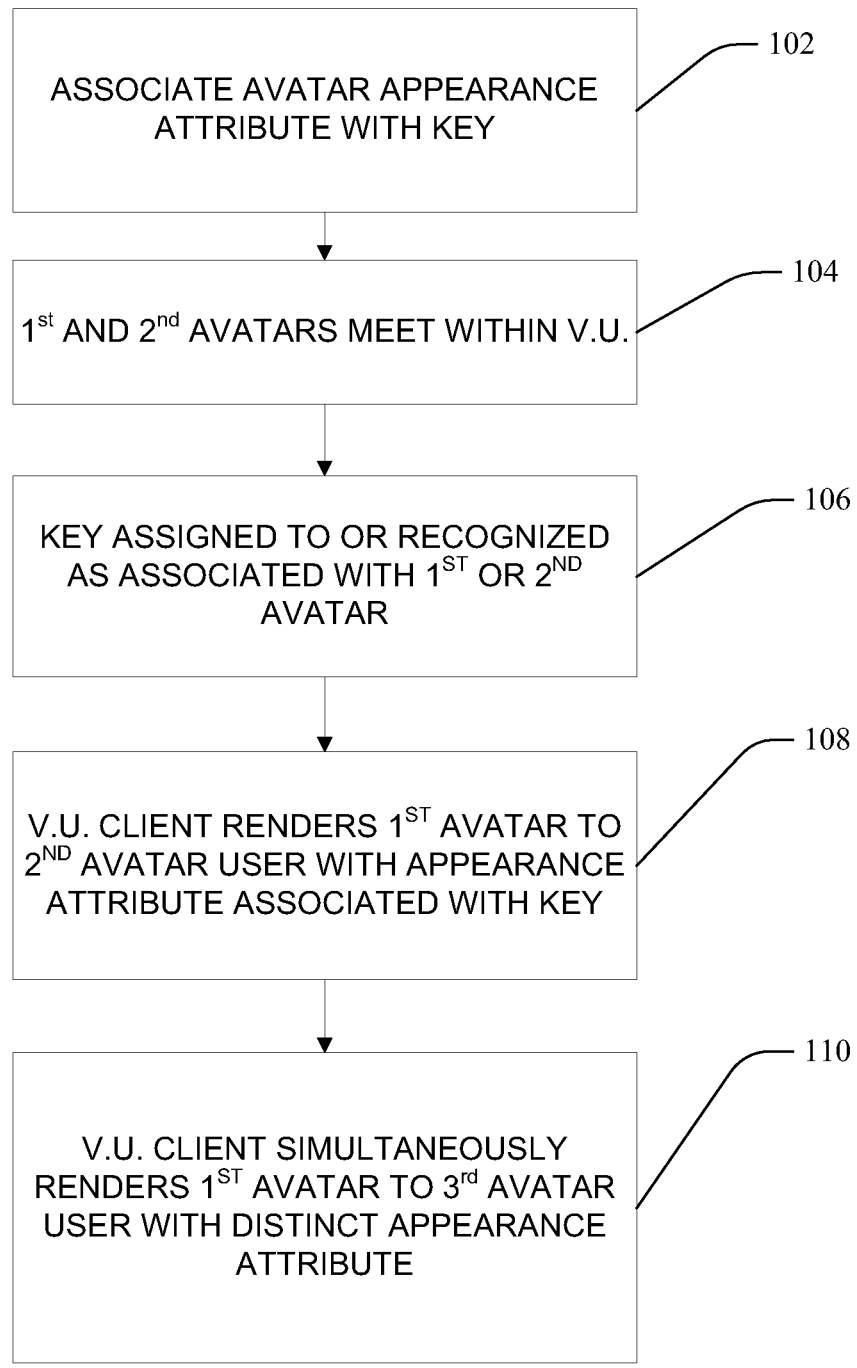
FIG. 1 is a flow chart illustrating a process and system for selectively rendering virtual universe avatars according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation I. General Description Referring now to FIG. 1, a method and process for viewer-responsive transformation or rendering of avatar appearances in a virtual world is illustrated. At 102 an appearance attribute created or defined for use in rendering a virtual universe user avatar is associated with a unique key. At 104 first and second virtual universe user avatars meet within a domain or region of a virtual universe. In one aspect, the encounter may be defined as the first user's avatar entering a display screen area of a VU client application operating on a second user's programmable device. Exemplary programmable devices include computers with associated monitor displays and hand-held devices such as a cellular phone or personal digital assistant (P.D.A.), and other programmable devices will be apparent to one skilled in the art.

At 106 the second user's VU client application associates the unique key with rendering the first user's avatar. The association at 106 may entail determining that the unique key is already associated with the first user's avatar. Examples include presence of the key in an inventory or association with the first user's avatar and/or the second user's avatar, and determining that the first user's avatar has been tagged with the key by the first user or other party or some application or function operation of a VU provider application. In some examples, the association at 106 entails the second user presently assigning the key to the first user avatar, for example tagging the first user's avatar with the key.

At 108 the first avatar is rendered or transformed by the second user's VU client application to appear with the appearance attribute associated with the key. Appearance attributes may include visual appearances and well as perceived avatar gestures and audio and chat communications. Moreover, in another aspect at 110 the first avatar may also be simultaneously visually rendered or transformed by a third user's VU client application with a different and distinct appearance as a function of the key not being associated with an engagement of the third user's avatar and the first user's avatar.

Figure 2:
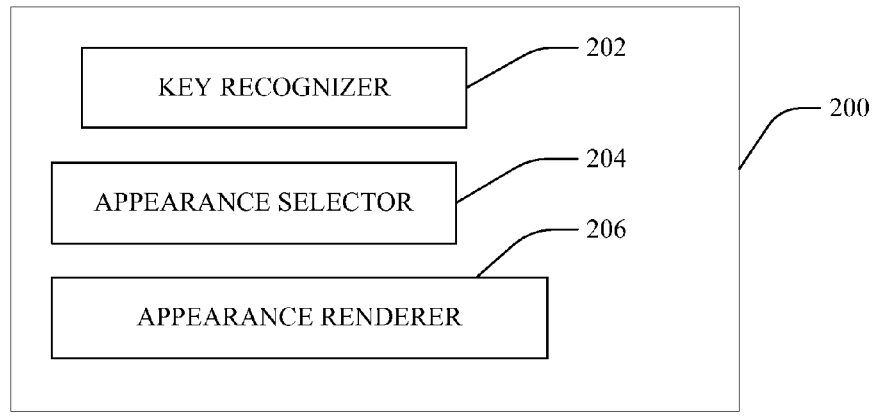
FIG. 2 is a block diagram illustration of a virtual universe client device configured to selectively render virtual universe avatars avatar according to the present invention.

FIG. 2 illustrates an avatar appearance rendering logic machine 200 for use with a virtual universe client or provider application according to the present invention. The logic machine 200 comprises a key recognizer component 202 configured to recognize keys associated with a virtual universe user avatar and an appearance selector component 204 configured to look-up an appearance associated with the recognized key. The logic machine 200 also has an appearance renderer component 206 configured to render or transform a specified avatar's appearance as displayed to a virtual universe user through a client application as a function of the key recognizer component 202 and the appearance selector component 204 outputs, for example by visually rendering a specified avatar to a VU user with a pre-defined appearance associated with a recognized key associated with the specified avatar or with another avatar. And in one aspect, the appearance renderer component 206 may be configured to render the specified avatar uniquely and independently with respect to appearance renderings to other virtual universe user avatars, and thus a specified avatar may be rendered with simultaneous and distinctly different appearances to different virtual universe users as a function of divergent recognized key associations.

The process illustrated in FIG. 1 and the logic machine illustrated in FIG. 2 and as described above are adaptable to function with respect to either or both of viewing-avatar dependent and viewed-avatar dependent key association or possession. Through the use of appearance keys a viewer may change the appearance of another avatar, for example selecting one of a plurality of available appearances, some of which may be predefined. The viewed avatar may automatically change appearance according to various criteria, controls, and signals. Additionally, an avatar may take on a different appearance for each viewer or situation encountered.

The present invention may configure how a "viewing" or viewer virtual universe user perceives the avatars of other virtual universe users, controlling or transforming the rendered appearances of other user avatars as presented to him through his virtual universe client application. In some examples, the viewing user may thus avoid being offended by another user's avatar, for example if the viewing user has conservative social or religious values he may configure his virtual universe client application to render all other user avatars with appropriate attire or clothing, wherein if he meets an avatar configured by it's user with revealing or suggestive attire his client application will instead render that avatar in conservative and acceptable clothing. Or the viewing user may alter the other avatar's appearance in order to more easily remember the avatar in a subsequent meeting.

In another aspect, the present invention is also adaptable to enable a user to control how his avatar is perceived by others, which may include selecting or forcing the use of different appearances of his avatar to be provided to different other users. In some examples, a user may specify or create multiple different appearances that may be selected and used to render his user avatar to other VU users, wherein an appearance chosen for any given viewing other user may be selected as a function of one or more aspects of the viewing user.

In some embodiments, each avatar in a VU may have several different appearances that may be controlled by the key of a viewing avatar. An avatar's appearance may be rendered as a function of an identification ("ID") key held by or associated with the avatar user-viewer, wherein an avatar is rendered in one appearance to another avatar/user holding a "manager" ID key and in another different appearance to another user holding a "security officer" ID key. In another example, a viewing avatar/user may hold a visually-impaired status key, resulting in rendering of the viewed avatar with accentuated facial expressions and features in order to increase visibility and perception.

A viewing avatar/user may also hold one or more viewer-preference keys. Thus in some examples a user having pre-existing personal knowledge of or relationship with another user (for example, friend, sibling, wife, etc.) may pre-specify a preferred appearance for the other avatar: for example, a wife may select a certain haircut or outfit when viewing her husband. Preference keys may also be identity-independent and more generic to avatar type or status: thus in some embodiments a generic dress key held by the viewing second avatar may cause female first avatar renderings to default to wearing a discrete dress, or a school uniform key may cause youthful first avatars to be rendered with suit coats and ties.

The nature of items in an avatar's inventory may also be considered and used to modify an appearance, or in some examples to produce an appearance key. Thus, in one example, if the viewing second avatar holds a youth bible in his avatar, a discrete dress appearance attribute or appearance key may be determined or recognized, causing another user's avatar to be rendered with an appearance suitable for a youth-church context.

In some embodiments, a viewing avatar may also create a custom appearance attribute for another avatar, sometimes while contemporaneously viewing the other avatar, and in some embodiment as a function or permission granted or status of the viewing user. For example, a viewing avatar with a "security guard" key may have permission to mark another avatar he needs to remember and track, for example one who may be deemed a security risk or who may have a history of dubious financial transactions or poor financial ratings, thereby enabling the viewed avatar to stand out visually for present and future monitoring. The visibility of such markings may be limited to the marking user or they may visible to other users holding an appropriate security guard key. Thus, in one example, a red scarf adornment may denote a present threat, and a blue scarf may denote a vetted or cleared avatar adorning the other user presently and in subsequent meeting renderings with a customized hat or scarf.

In one aspect, enhancing memory with respect to others is useful in both social and business settings, and thus a viewer may be enabled to change the appearance of another to one more memorable, perhaps adding sports paraphernalia to remember a favorite team of the other user. It may be difficult to remember the appearance of another user where his avatar frequently change appearances, and the present invention thus also helps a viewing avatar recognize friends, business colleagues, sales people, customers, and acquaintances by enabling customization of the other avatars in manners of his choosing that may remain constant through various subsequent avatar appearance iterations.

Thus, both viewed and viewing users may play roles in the appearance process of a given avatar, with a resident specifying divergent appearances for his avatar to be selected as a function of a viewing user attribute, and wherein the viewing user may also specify certain appearances or attributes for the same avatar, for example applying religious, censorship, or ease-of-recognition objectives. In the case of appearance preferences by both a viewing user and the viewed-avatar user, an avatar may be rendered consistent with both viewing and viewed-user specifications where they do not conflict. Or, in the case of a conflict results one user's preferences may be superior to another's. In one example a virtual universe may provide rendering rules that select a viewed-avatar's user's preferences over those of a viewing user in the case of a conflict. Conflict resolution may also be dependent upon user status, with some user having a superior preferential status over other users, and hence their appearance specifications: thus a manager, parent or premium user may trump the conflicting appearance directives or another employee, child or basic-subscription user. Other conflict resolution methods will be apparent to one skilled in the art.

A VU avatar or object may broadcast an appearance attribute stream, wherein each viewing-avatar may broadcast an attribute or key for use in selecting one or more of the streamed plurality of appearance or perception attributes, and the rendering of the viewed avatar (or object) may be responsively altered thereby changing a visual or audio appearance of the viewed avatar or object. A plurality of appearance attributes may be appropriate for any given viewing-avatar attribute or key, and thus one of a plurality of appropriate appearance attributes may be selected in response to a selection or additional parameter, for example as function of a manual choice or a preference. Thus, in some embodiments, a viewing or viewed avatar or object may manually select or dial-in a preferred one from a given broadcast attribute stream. The nature of an avatar inventory item may also cause a further subset selection or winnowing of the choices, for example an inventory classical music item may be used to further pare punk-rocker appearance attributes from the possible plurality for use with any given key. Moreover, if the viewed first avatar/object has not required or selected any one appearance from a plurality of possible appearances or for a given key, in some embodiments the viewing second avatar may choose or force one of the appearances.

The present invention may also be utilized with respect to the appearance attributes of other VU universe textures and objects. Thus, the first user avatar rendered at 108 may instead be a VU object such as a building, an automobile, architecture features, landscapes, vegetation, and advertising billboards. In one example, a billboard may be populated with a sales promotion appropriate to items in the second user's inventory (e.g. a special bicycle sales ad populated in response to the presence of inventory bicycle paraphernalia). In another example, a VU sales kiosk may be rendered to emulate Frank Gehry's design of the Bilbao Museum in order to entice the attention of a second user avatar with an architecture textbook in his inventory.

Keys may be created manually by a VU user/resident or provider entity and stored in an avatar or object profile or inventory. In some embodiments, a key may be generated on-the-fly by a VU client or provider application intelligent agent based on an analysis of the viewer. For example, if the second viewer avatar owns a philosophical treatise on morals in his inventory, he may be more conservative than someone who has a gambling manual in his inventory, or than an avatar that has visited ten casinos in the past, and accordingly a conservative attribute key may be generated and assigned to the second user's avatar.

Multiple possible appearances of the avatar may be created by a user or resident who owns the avatar or by a second party (for example a parent or organization or employer of the user). Each of the pre-created appearances may be tagged with one or more specific keys each associated with different renderings of the avatar. In one example five different appearances for a user's avatar are each associated with a unique key:

(i) Key No. 1="Manager", UID="1234", Appearance="Shirt, Tie, Trousers, Shoes";
(ii) Key No. 2="Wife", UID="2345" Appearance="Slacks, Open Shirt, Sneakers";
(iii) Key No. 3="Kids", UID="2832 and 1723", Appearance="Jeans, 'I love my Kids' Tee-shirt";
(iv) Key No. 4="DavidPrice", UID="1886", Appearance="Spectacles, Beard, Big Hat"; and
(v) Key No. 5=Default, UID="any", Appearance="Jeans, Polo-shirt."

The viewed-avatar user may thus choose the appearance that should be associated with each of these keys as possessed by a viewing avatar encountering the user's avatar in the VU domain. Keys may be identified by their generic names (e.g. Manager, Wife, and Kids) which may be non-specific to any particular VU avatar user identity as long as the appropriate key is associated with the viewing user's avatar. In another aspect, a unique identifier (UID) may be assigned to each key, which is unique to a particular avatar: thus in the present example a specific manager of this user has an avatar with a UID of 1234, and wherein a UID of 2832 is a unique identifier of one of the avatar's children. A default appearance may also be provided: in the present example if no other of Key No.'s 1-4 is present, then the default Key No. 5 appearance is selected and/or assigned to the viewing avatar.

In one example, an avatar of a user configured to provide the appearances associated with the five Key No.'s 1-5 described above enters a workplace or other business formal setting within a VU region and meets the avatar of his or her manager having a UID of 1234. Upon recognition of the UID=1234 the Key No. 1 appearance is selected at 106 and the user's avatar is rendered to the manager at 108 as wearing a shirt and tie. If the user meets another stranger avatar who does not have any of the Keys No.'s 1-4 or their listed UIDs, the user's avatar is rendered with the default Key No. 5 appearance to the stranger as wearing jeans and a polo shirt.

Appearance attributes are not limited to visual image information but may also extend to gestures, audible sounds, and other characteristics of an avatar. For example, a user avatar may not wish to hear certain kinds of music or artist performances, and thus the present invention can make use of an appearance key to suppress or modify such audio characteristics by preventing punk music from playing through a stereo object held by another user avatar or the appearance of a pet associated with the other user's avatar.

II. Computerized Implementation

Figure 3:
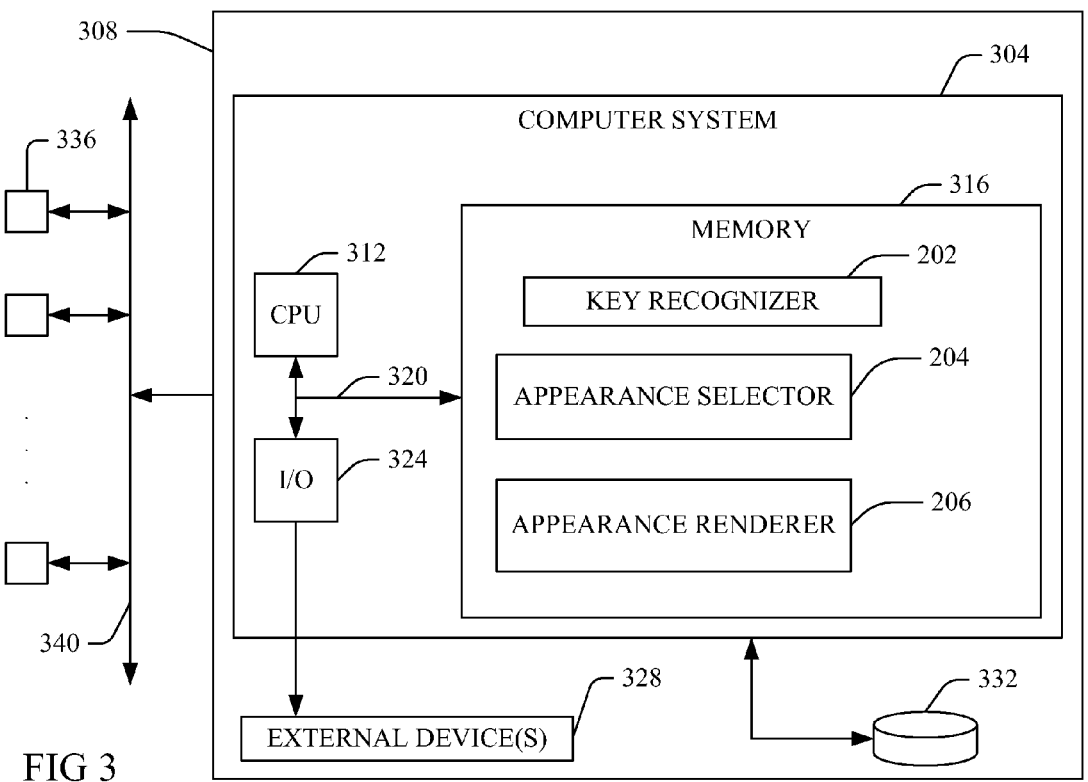
FIG. 3 is a block diagram illustrating an exemplary computerized implementation of a system and method for selectively rendering virtual universe avatars according to the present invention.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for viewer-responsive transformation of avatars illustrated in FIGS. 1 and 2 and described above, including the key recognizer 202, the appearance selector 204 and the appearance attribute renderer engine 206 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to viewer-responsive transformation of avatars. To this extent, the computer-readable/useable medium includes program code that implements each of the various process steps of the invention.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation could be deployed, managed, serviced, etc. by a service provider who offers to implement, deploy, and/or perform the functions of the present invention for viewer-responsive transformation of avatars, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for viewer-responsive transformation of avatars, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for viewer-responsive transformation of avatars in a virtual universe, the method comprising:

defining a plurality of different appearance attributes for use in rendering a first avatar of a first user to a virtual universe client of a second user of a second avatar within the virtual universe, wherein the different appearance attributes comprise visually different clothing attire items or visually different hairstyles;

associating each of the different defined appearance attributes with a different key of a plurality of keys, and with different ones of a plurality of unique identifiers;

in response to the second avatar encountering the first avatar within the virtual universe, analyzing an inventory of assets of the second avatar to determine a nature of an item possessed within the second avatar inventory, and determining if a unique identifier assigned to the second avatar is one of the plurality of unique identifiers assigned to the different keys;

rendering the first avatar to the second user in a virtual universe graphic user interface display as wearing one of the defined appearance attribute clothing attire item or hairstyle that is associated with one of the keys that is associated with the determined nature of the item possessed within the inventory of the second avatar and that is associated with the unique identifier assigned to the second avatar; and rendering the first avatar simultaneously to a third user of a third avatar encountering the first avatar within the virtual universe environment as wearing another of the appearance attribute clothing attire items or hairstyles that is visually distinct and different from the defined appearance attribute clothing attire item or hairstyle rendered to the second user as worn on the first avatar as a function of an inventory of the third avatar not possessing an item having the determined nature of the item possessed by the inventory of the second avatar.

2. The method of claim 1, further comprising:

the first user of the first avatar defining each of the defined plurality of avatar appearance attributes; and the first user associating each of the keys with different ones of the defined avatar appearance attributes, and with different ones of a plurality of unique identifiers.

3. The method of claim 2, further comprising the first user associating one of the keys with the unique identifier assigned to the second avatar as a function of recognizing that an identity of the second user is a friend, sibling, spouse, family member or manager of the first user.

4. The method of claim 3, further comprising selecting one of a plurality of the attributes that is associated with the key possessed by the second avatar for rendering the first avatar as a function of a preference of the first user of the first avatar or of the second user.

5. The method of claim 4, wherein the selecting the one of the plurality of appearance attributes for rendering the first avatar further comprises the second user manually selecting the one of the plurality of appearances from a broadcast stream of the plurality of attributes.

6. The method of claim 2, further comprising:

the first avatar broadcasting a stream of the plurality of avatar appearance attributes to a virtual universe client of the second user;

the first user of the first avatar assigning one of the keys to the second avatar; and the visually rendering of the first avatar to the second user comprising the second user virtual universe client selecting and rendering the first avatar wearing one of the broadcast plurality of appearance attributes as a function of an association of the selected one of the broadcast plurality of appearance attributes with the key assigned to the second avatar.

7. The method of claim 1, wherein the determined nature of the item possessed within the inventory of the second avatar is a socially conservative nature; and wherein the step of rendering the first avatar to the second user comprises rendering the first avatar as wearing one of a socially conservative clothing attire item or a socially conservative hairstyle.

8. A method for a service for viewer-responsive transformation of avatars in a virtual universe, the method comprising:

providing a computer infrastructure comprising a processing unit in communication with a computer readable memory and a tangible computer-readable storage device;

wherein the processing unit, when executing program instructions stored on the tangible computer-readable storage device via the computer readable memory:

defines a plurality of different avatar appearance attributes for use in rendering a first avatar of a first user to a virtual universe client of a second user of a second avatar within the virtual universe wherein the different appearance attributes comprise visually different clothing attire items or visually different hairstyles;

associates each of the different defined appearance attributes with a different key of a plurality of keys and with different ones of a plurality of unique identifiers;

in response to the second avatar encountering the first avatar within the virtual universe, analyzes an inventory of assets of the second avatar to determine a nature of an item possessed within the inventory of the second avatar and determines if a unique identifier assigned to the second avatar is one of the plurality of unique identifiers assigned to the different keys;

renders the first avatar encountered within the virtual universe by the second avatar in a virtual universe graphic user interface display of the second user as wearing one of the defined appearance attribute clothing attire item or hairstyle that is associated with one of the keys that is associated with the determined nature of the item possessed within the inventory of the second avatar and that is associated with the unique identifier assigned to the second avatar; and renders the first avatar simultaneously to a third user of a third avatar encountering the first avatar within the virtual universe environment as wearing another appearance attribute clothing attire item or hairstyle that is distinct and different from the defined appearance attribute rendered as worn to the second user, as a function of an inventory of the third avatar not possessing an item having the determined nature of the item that is possessed by the inventory of the second avatar.

9. The method of claim 8, wherein the computer infrastructure processing unit, when executing program instructions stored on the tangible computer-readable storage device via the computer readable memory, further:

enables a first user of the first avatar to define the defined avatar appearance attribute and associate the key with the defined avatar appearance attribute; and enables the first user to associate each of the keys with different ones of the defined avatar appearance attributes, and with different ones of a plurality of unique identifiers.

10. The method of claim 8, wherein the computer infrastructure processing unit, when executing program instructions stored on the tangible computer-readable storage device via the computer readable memory, further:

determines that the nature of the item possessed within the inventory of the second avatar is a socially conservative nature; and renders the first avatar to the second user as wearing one of a socially conservative clothing attire item or a socially conservative hairstyle.

11. The method of claim 10, wherein the computer infrastructure processing unit, when executing program instructions stored on the tangible computer-readable storage device via the computer readable memory, further:

broadcasts a stream of the plurality of avatar appearance attributes to a virtual universe client of the second user; and visually renders the first avatar to the second user by selecting and rendering the first avatar wearing one of the broadcast plurality of appearance attributes.

12. An article of manufacture, comprising:

a computer readable physical storage device having computer readable program code embodied therewith, the program code comprising instructions which, when executed on a computer system, cause the computer system to:

define a plurality of different avatar appearance attributes for use in rendering a first avatar within a virtual universe, wherein the different appearance attributes comprise visually different clothing attire items or visually different hairstyles;

associate each of the different defined appearance attributes with different keys of a plurality of keys, and with different ones of a plurality of unique identifiers;

in response to a second avatar of a second user encountering the first avatar within the virtual universe, analyze an inventory of assets of the second avatar to determine a nature of an item possessed within the inventory of the second avatar and determine if a unique identifier assigned to the second avatar is one of the plurality of unique identifiers assigned to the different keys;

render the first avatar encountered within the virtual universe by the second avatar in a virtual universe graphic user interface display as wearing one of the defined appearance attribute clothing attire item or hairstyle that is associated with one of the keys that is associated with the determined nature of the item possessed within the inventory of the second avatar and that is associated with the unique identifier assigned to the second avatar; and render the first avatar simultaneously to a third user of a third avatar encountering the first avatar within the virtual universe environment as wearing another of the appearance attributes that is different and distinct from the defined appearance attribute clothing attire item or hairstyle rendered to the second user as worn on the first avatar as a function of an inventory of the third avatar not possessing an item having the determined nature of the item that is possessed by the inventory of the second avatar.

13. The article of manufacture of claim 12, wherein the computer readable program code instructions, when executed on the computer system, further cause the computer system to:

enable a first user of the first avatar to define the defined avatar appearance attribute and associate the key with the defined avatar appearance attribute; and enable the first user to associate each of the keys with different ones of the defined avatar appearance attributes, and with different ones of a plurality of unique identifiers.

14. The article of manufacture of claim 12, wherein the program code instructions, when executed on the computer system, further cause the computer system to:

determine that the nature of the item possessed within the inventory of the second avatar is a socially conservative nature; and render the first avatar to the second user as wearing one of a socially conservative clothing attire item or a socially conservative hairstyle.

15. The article of manufacture of claim 14, wherein the program code instructions, when executed on the computer system, further cause the computer system to:

broadcast a stream of the plurality of avatar appearance attributes to a virtual universe client of the second user; and visually render the first avatar to the second user by selecting and rendering the first avatar wearing one of the broadcast plurality of appearance attributes.

16. A system, comprising:

a processing unit;

a computer readable memory and a computer-readable physical storage device, each in communication with the processing unit; and a network interface in communication with the processing unit and a virtual universe region;

wherein the processing unit, when executing program instructions stored on the computer-readable storage device via the computer readable memory:

associates each of a plurality of different avatar appearance attributes for use in rendering a first avatar within the virtual universe with a different key of a plurality of keys and with different ones of a plurality of unique identifiers, wherein the different appearance attributes comprise visually different clothing attire items or visually different hairstyles;

in response to a second avatar of a second user encountering the first avatar within the virtual universe, analyzes an inventory of assets of the second avatar to determine a nature of an item possessed within the inventory of the second avatar and determines if a unique identifier assigned to the second avatar is one of the plurality of unique identifiers assigned to the different keys;

renders the first avatar when encountered within the virtual universe by a second avatar to the second virtual universe user in a virtual universe graphic user interface display as wearing at least one of the defined appearance attribute clothing attire item or hairstyle that is associated with one of the keys that is associated with the determined nature of the item possessed within the inventory of the second avatar and that is associated with the unique identifier assigned to the second avatar; and renders the first avatar simultaneously to a third user of a third avatar encountering the first avatar within the virtual universe environment as wearing another of the appearance attribute clothing attire items or hairstyles that is different and distinct from the at least one of the defined appearance attributes rendered as worn on the first avatar to the second user as a function of an inventory of the third avatar not possessing an item having the determined nature of the item that is possessed by the inventory of the second avatar.

17. The system of claim 16, wherein the processing unit, when executing program instructions stored on the computer-readable physical storage device via the computer readable memory:

enables a first user of the first avatar to define the defined avatar appearance attribute and associate the key with the defined avatar appearance attribute; and enables the first user to associate each of the keys with different ones of the defined avatar appearance attributes, and with different ones of a plurality of unique identifiers.

18. The system of claim 16, wherein the processing unit, when executing program instructions stored on the computer-readable physical storage device via the computer readable memory, further:

determines that the nature of the item possessed within the inventory of the second avatar is a socially conservative nature; and renders the first avatar to the second user as wearing one of a socially conservative clothing attire item or a socially conservative hairstyle.

19. The system of claim 16, wherein the processing unit, when executing program instructions stored on the computer-readable physical storage device via the computer readable memory, further:
  associates one of the keys with the unique identifier assigned to the second avatar as a function of recognizing that an identity of the second user is a friend, sibling, spouse, family member or manager of the first user.

\* \* \* \* \*

UNITED STATES PATENT AND TRADEMARK OFFICE
CERTIFICATE OF CORRECTION

Page 1 of 1

PATENT NO. : 8,648,865 B2
APPLICATION NO. : 12/238560
DATED : February 11, 2014
INVENTOR(S) : Christopher J. Dawson et al.

It is certified that error appears in the above-identified patent and that said Letters Patent is hereby corrected as shown below:

On the title page, item (45) please remove "*" before Feb. 11, 2014.

On the title page, item (*) please delete the following paragraph "This patent is subject to a terminal disclaimer".

Signed and Sealed this
First Day of July, 2014

Michelle K. Lee
*Deputy Director of the United States Patent and Trademark Office*